March 27, 1951    L. P. F. VAN DER GRINTEN    2,546,482
EXPOSURE APPARATUS FOR MAKING PHOTO COPIES
Filed Aug. 24, 1948
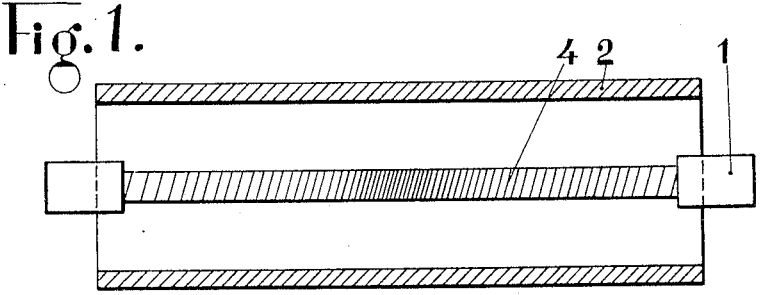
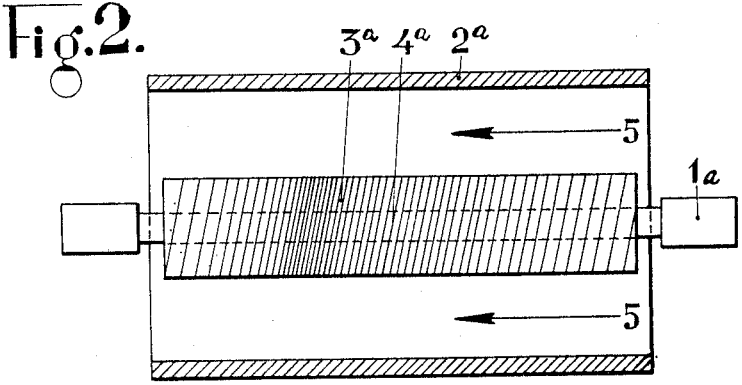
INVENTOR
LODEWIJK PIETER FRANS VAN DER GRINTEN
BY Hammond & Littell
ATTORNEYS Patented Mar. 27, 1951

2,546,482

UNITED STATES PATENT OFFICE 2,546,482

EXPOSURE APPARATUS FOR MAKING PHOTO COPIES

Lodewijk Pieter Frans van der Grinten, Venlo, Netherlands, assignor to Chemische Fabriek L. van der Grinten, Venlo, Netherlands, a company of the Netherlands Application August 24, 1948, Serial No. 45,860
In the Netherlands August 25, 1947

4 Claims. (Cl. 88—24)

The invention relates to an exposure apparatus for making photo copies. It aims at obtaining a homogeneous effect of the light on the surface to be exposed.

In practice, a non-homogeneous effect of the light over a flat or cylindrical surface is especially objectionable when using modern processes, particularly positive diazotype printing. With this positive process, in contrast with negative processes, a non-homogeneous effect of the light is very striking. In addition, the positive diazotype processes, especially when applied as reflex-copying processes, require very high light energies, for which reason light sources at short distance have begun to be used, and owing to this the homogeneity problem is increased per se. The light effect naturally depends on the light intensity in the exposing area but in the case of positive diazotype printing it depends also on the prevailing temperature. Since the latter, as will be explained more in detail, is often unequal over the surface to be exposed, the problem of obtaining a homogeneous effect as a rule cannot be solved by merely bringing about an equal distribution of intensity, and it may even be necessary, under certain circumstances, to compensate the differences of temperature by bringing about intentional inequality of the light intensity.

Up to the present this problem has not been solved in any sufficiently simple manner.

The exposure apparatus for making photo copies according to the present invention contains, between the light source and the object to be exposed, an extensively apertured screen, in which the material of which it is made is so distributed that the light passing through the apertures exerts homogeneous activity on the object. According to the invention the screen may be made of wire, tape or similar elongated material.

The arrangement according to the invention has been found to be particularly advantageous when applied to an exposure apparatus for making photo copies in which the light source has an elongated shape, when the screen surrounds the light source. A surprisingly simple embodiment is obtained when the screen is made to consist of rings or a wire wound in a helix or the like. The invention may be explained more in detail with reference to the drawings.

Fig. 1 is a diagrammatic cross-section of a cylindrical exposure apparatus.

Fig. 2 is a corresponding sectional view of another embodiment.

The embodiment according to Fig. 1 has an elongated light source $1$ (a low-pressure mercury vapour tube lamp), mounted axially in the glass cylinder $2$, on the outer surface of which the material to be exposed is applied. Cylinder $2$ may be stationary with the material to be copied on it; it may be stationary while the material is passed along its surface by means of a conveyor-belt, and it may rotate together with the material to be exposed.

The effect of the light is not homogeneous over the whole length of the cylinder. The intensity is greatest in the middle and decreases towards the edges. The intensity might be homogenized by the use of a relatively longer lamp, but this is not advantageous.

Now a helical wire $4$ is so applied on the cylindrical lamp $1$ that the intensity of the light on cylinder $2$ is homogenized. It can readily be ascertained experimentally to what degree the turns of helices should be spaced closer together, toward the middle.

Use may also be made successfully of rings applied in a corresponding manner, as also of a twisted net-work, crossing helical wires, etc.

The embodiment according to Fig. 2 is a preferred form. Just like that according to Fig. 1 it has a long light source $1a$ (in this case, however, a high-pressure mercury vapour tube lamp), mounted axially in the glass cylinder $2a$. Cylinder $2a$ again may be stationary with the material to be copied on it; it may be stationary while the material is passed across it by means of a conveyor-belt, and it may rotate together with the material to be exposed. Inside the cylinder $2a$ and round the lamp $1a$ a glass cylinder $3a$ has been mounted and according to the invention a wire $4a$ has been wound helically round it.

With exposure apparatus for making photo copies of this type, lamp $1a$ is powerful, with a view to making diazotype copies. Thus, if an apparatus with a lamp of 1000 watts and a length of 18 inches is built in a cylinder having a diameter of 4 inches and a length of 16 inches, cooling will be necessary and this will preferably be brought about in practice with an air current through the space between the cylinders $2a$ and $3a$, for example from right to left according to the arrows $5$. Now the effect of the light will be non-homogeneous by two causes: in the first place the intensity is greatest in the middle and, secondly, the temperature of cylinder $2$ (and consequently the temperature of the material to be exposed) will be highest on the left.

The former cause might be eliminated by the use of a relatively longer lamp; however, as has been said before, this is inefficient. With longer cylinders (and lamp 1) the difference in temperature between the two ends will become greater.

Now according to the invention the helical wire $4a$, as illustrated diagrammatically in Fig. 2, is so placed that it has a homogenizing effect with respect to the two factors causing the non-homogeneity of the light effect, viz. the difference in the intensity and the difference in temperature.

With apparatus according to Fig. 2 the temperature and consequently the light-sensitivity of diazotype material will increase towards the left, while the intensity of the light will increase from the two sides to the middle, if the lamp is not excessively long. The zone of greatest activity of the light, therefore, lies to the left of the middle and decreases in both directions in a given manner which has not been calculated in detail. By experiment, however, it may be determined in an extremely simple way how the windings of the helix are to be arranged in order to bring about effective homogenization. The wire $4a$ is chosen as thin as is practically possible, but if the distance between $2a$ and $3a$ is sufficient, it may be thicker or broader, and may even advantageously be replaced by a tape. Naturally, the helical wire or tape $4a$ need not be a detachable or separate part with respect to cylinder $3a$.

What I claim is:

1. In an exposure apparatus for photoprinting, comprising an elongated light source and means for holding sheet material in a coaxial position for exposure by light emanating from said source, a cylindrical light shield surrounding the light source between it and said position comprising relatively long and narrow light-absorbent elements curved around and spaced apart along the axis of the shield with adjacent elements at varying distances of axial spacing across the path of the exposing light, each of such curved elements having a substantially uniform width throughout its length.

2. In an exposure apparatus for photoprinting, comprising an elongated light source and means for holding sheet material in a position curved about and spaced radially from the axis of said source for exposure by light emanating therefrom, a cylindrical light shield surrounding the light source between it and said position comprising an opaque filament of substantially uniform width extending about said axis in a multiplicity of helical windings spaced apart at varying distances along said axis, the spacings of said windings varying in inverse proportion to variations of the exposing capacity upon such sheet material of the light emanating to the regions of the respective windings.

3. In an exposure apparatus for photoprinting, comprising a light-pervious cylinder to hold sheet material for exposure and an elongated lamp tube on the axis of said cylinder, a light shield surrounding said tube inside said cylinder comprising a light-pervious cylindrical body having a relatively long and narrow opaque strip extending thereabout in a multiplicity of helical windings spaced apart at varying distances along said axis, the windings of closest spacing being in a region intermediate the ends of said tube and those of widest spacing being adjacent said ends, so as to counteract normal irregularities in the exposing effect of light from said tube.

4. An exposure apparatus as described in claim 3, wherein said strip is a wire wound helically around said cylindrical body.

LODEWIJK PIETER FRANS
VAN DER GRINTEN.

REFERENCES CITED

The following references are of record in the file of this patent:

UNITED STATES PATENTS

| Number | Name | Date |
|---|---|---|
| 1,106,504 | Floeter | Aug. 11, 1914 |
| 1,900,966 | Wolfe | Mar. 14, 1933 |
| 2,351,251 | Davenport | June 13, 1944 |